(12) United States Patent
Chien et al.

(10) Patent No.: US 10,306,143 B2
(45) Date of Patent: May 28, 2019

(54) MULTIPLE LENSES SYSTEM AND PORTABLE ELECTRONIC DEVICE EMPLOYING THE SAME

(71) Applicant: Chiun Mai Communication Systems, Inc., New Taipei (TW)

(72) Inventors: How-Wen Chien, New Taipei (TW); Po-Yen Liu, New Taipei (TW)

(73) Assignee: Chiun Mai Communication Systems, Inc., New Taipei (TW)

( * ) Notice: Subject to any disclaimer, the term of this patent is extended or adjusted under 35 U.S.C. 154(b) by 0 days.

(21) Appl. No.: 15/430,610

(22) Filed: Feb. 13, 2017

(65) Prior Publication Data

US 2017/0244896 A1 Aug. 24, 2017

(30) Foreign Application Priority Data

Feb. 22, 2016 (CN) .......................... 2016 1 0095738

(51) Int. Cl.
| | | |
|---|---|---|
| G02B 7/40 | (2006.01) |
| G03B 3/10 | (2006.01) |
| G01S 17/08 | (2006.01) |
| G01S 17/88 | (2006.01) |
| G02B 13/00 | (2006.01) |
| G03B 13/20 | (2006.01) |

(Continued)

(52) U.S. Cl.
CPC ......... *H04N 5/23245* (2013.01); *G01S 17/08* (2013.01); *G01S 17/88* (2013.01); *G02B 7/40* (2013.01); *G02B 13/001* (2013.01); *G03B 3/10* (2013.01); *G03B 13/20* (2013.01); *G03B 17/12* (2013.01); *H04N 5/2254* (2013.01); *H04N 5/23212* (2013.01); *H04N 13/25* (2018.05); *H04N 13/289* (2018.05)

(58) Field of Classification Search
None
See application file for complete search history.

(56) References Cited

U.S. PATENT DOCUMENTS

| | | | | |
|---|---|---|---|---|
| 5,003,404 A | * | 3/1991 | Yoshimura ........... | H04N 5/2621 348/239 |
| 6,141,036 A | * | 10/2000 | Katayama ............ | G02B 27/017 348/47 |

(Continued)

FOREIGN PATENT DOCUMENTS

| | | |
|---|---|---|
| CN | 103488039 A | 1/2014 |
| CN | 104363379 A | 2/2015 |
| CN | 104811620 A | 7/2015 |

*Primary Examiner* — Twyler L Haskins
*Assistant Examiner* — Quan Pham
(74) *Attorney, Agent, or Firm* — ScienBiziP, P.C.

(57) ABSTRACT

A multiple lenses system includes a lens module, a processing unit, a switching unit, and a focus module. The lens module includes a plurality of lenses. The switching unit is electrically connected to the plurality of lenses and the processing unit. The focus module includes a laser emitter and a laser receiver. The laser emitter emits laser beam towards an object under control of the processing unit. The laser receiver receives the laser beam reflected by the object. The processing unit obtains a focus distance between the object and the focus module according to a time difference from emitting the laser beam to receiving the laser beam, and controls the switching unit to switch and to select at least one of the plurality of lenses according to the focus distance.

18 Claims, 3 Drawing Sheets

(51) Int. Cl.
*G03B 17/12* (2006.01)
*H04N 13/25* (2018.01)
*H04N 5/225* (2006.01)
*H04N 5/232* (2006.01)
*H04N 13/289* (2018.01)

(56) References Cited

U.S. PATENT DOCUMENTS

| | | | |
|---|---|---|---|
| 6,243,537 B1* | 6/2001 | Higashino | G01C 3/08 396/106 |
| 7,023,913 B1* | 4/2006 | Monroe | G08B 13/19628 348/143 |
| 7,973,825 B2* | 7/2011 | Akiyama | H04N 1/0402 348/222.1 |
| 9,930,239 B2* | 3/2018 | Di | H04N 5/2251 |
| 2003/0020814 A1* | 1/2003 | Ono | H04N 5/225 348/220.1 |
| 2003/0117501 A1* | 6/2003 | Shirakawa | H04N 5/2251 348/218.1 |
| 2006/0187310 A1* | 8/2006 | Janson, Jr. | H04N 5/2254 348/218.1 |
| 2008/0211941 A1* | 9/2008 | Deever | H04N 5/2258 348/262 |
| 2010/0097444 A1 | 4/2010 | Lablans | |
| 2010/0303375 A1* | 12/2010 | Suzuki | H04N 5/208 382/261 |
| 2013/0021447 A1* | 1/2013 | Brisedoux | H04N 5/2258 348/47 |
| 2014/0176767 A1* | 6/2014 | Hamel | H04N 5/23296 348/240.2 |
| 2017/0180615 A1* | 6/2017 | Lautenbach | F21V 23/003 |
| 2018/0007272 A1* | 1/2018 | Masuda | H04N 5/23267 |

* cited by examiner

MULTIPLE LENSES SYSTEM AND PORTABLE ELECTRONIC DEVICE EMPLOYING THE SAME

CROSS-REFERENCE TO RELATED APPLICATIONS

This application claims priority to Chinese Patent Application No. 201610095738.X filed on Feb. 22, 2016, the contents of which are incorporated by reference herein.

FIELD

The subject matter herein generally relates to a multiple lenses system for automatically switching lenses and a portable electronic device employing the multiple lenses system.

BACKGROUND

Portable electronic devices normally include a lens module for daily photographing. Traditional lens module has only one lens, however, when switching the focus on objects at macro distances, the lens needs a certain period of time for focusing and the resulted images may turn fuzzy.

BRIEF DESCRIPTION OF THE DRAWINGS

Many aspects of the disclosure can be better understood with reference to the following figures. The components in the figures are not necessarily drawn to scale, the emphasis instead being placed upon clearly illustrating the principles of the disclosure. Moreover, in the drawings, like reference numerals designate corresponding parts throughout several views.

DETAILED DESCRIPTION

Figure 1:
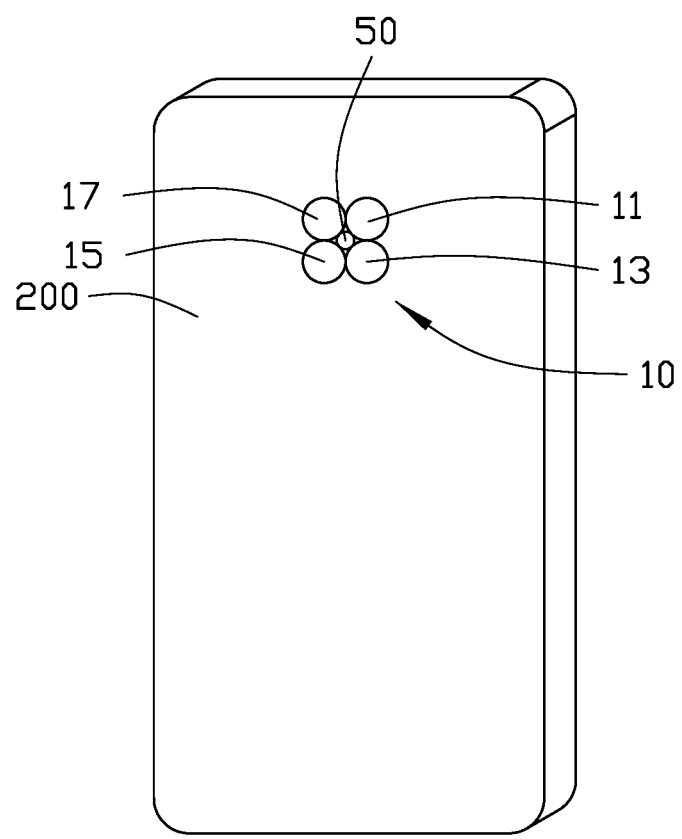
FIG. 1 is a schematic diagram of an exemplary embodiment of a multiple lenses system applied to a portable electronic device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series and the like.

FIG. 1 illustrates a multiple lenses system 100 applied in a portable electronic device 200. The multiple lenses system 100 can be a portion of the portable electronic device 200. In this exemplary embodiment, the portable electronic device 200 can be a mobile phone, a tablet computer, or a personal digital assistant (PDA), which has a screen for displaying images and user interface.

Figure 2:
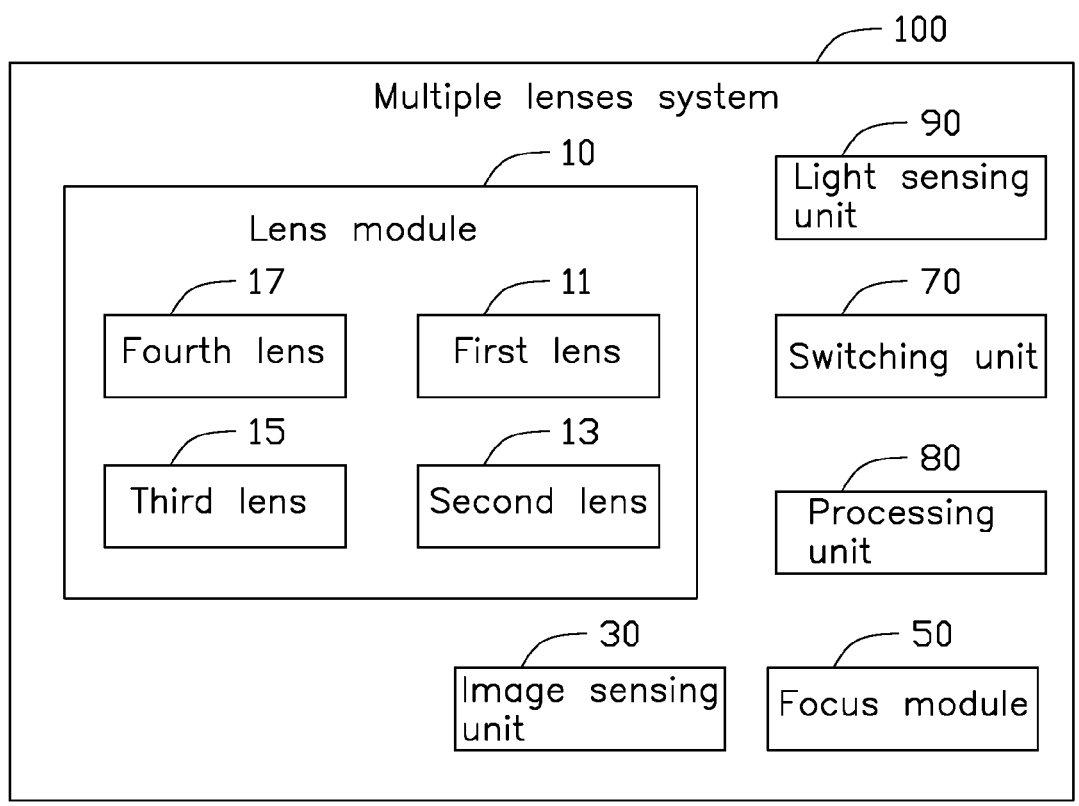
FIG. 2 is a block diagram of the multiple lenses system of FIG. 1.

As illustrated in FIG. 2, the multiple lenses system 100 includes a lens module 10, an image sensing unit 30, a focus module 50, a switching unit 70, and a processing unit 80.

In this exemplary embodiment, the lens module 10 includes four lenses, that is, a first lens 11, a second lens 13, a third lens 15, and a fourth lens 17. In at least one embodiment, the first lens 11 and the third lens 15 are high-pixel lenses. The second lens 13 is a normal lens. The fourth lens 17 is a macro lens and is configured to capture images of objects in macro distances. In this exemplary embodiment, different lens or lenses (that is, at least one lens) can achieve different capturing functions. For example, to capture objects in macro distances, the fourth lens 17 can be selected. Additionally, two of the first lens 11, the second lens 13, and the third lens 15 can be selected for capturing images under one of a 3D image mode, a HDR mode, a low light image quality mode, and a high resolution mode. Different capturing modes are corresponding to different lens or lenses. The lens module 10 further includes a focus distance threshold, when a distance between the object and the lens module 10 is less than the focus distance threshold, only the fourth lens 17 of the lens module 10 can focus on the object clearly.

Figure 3:
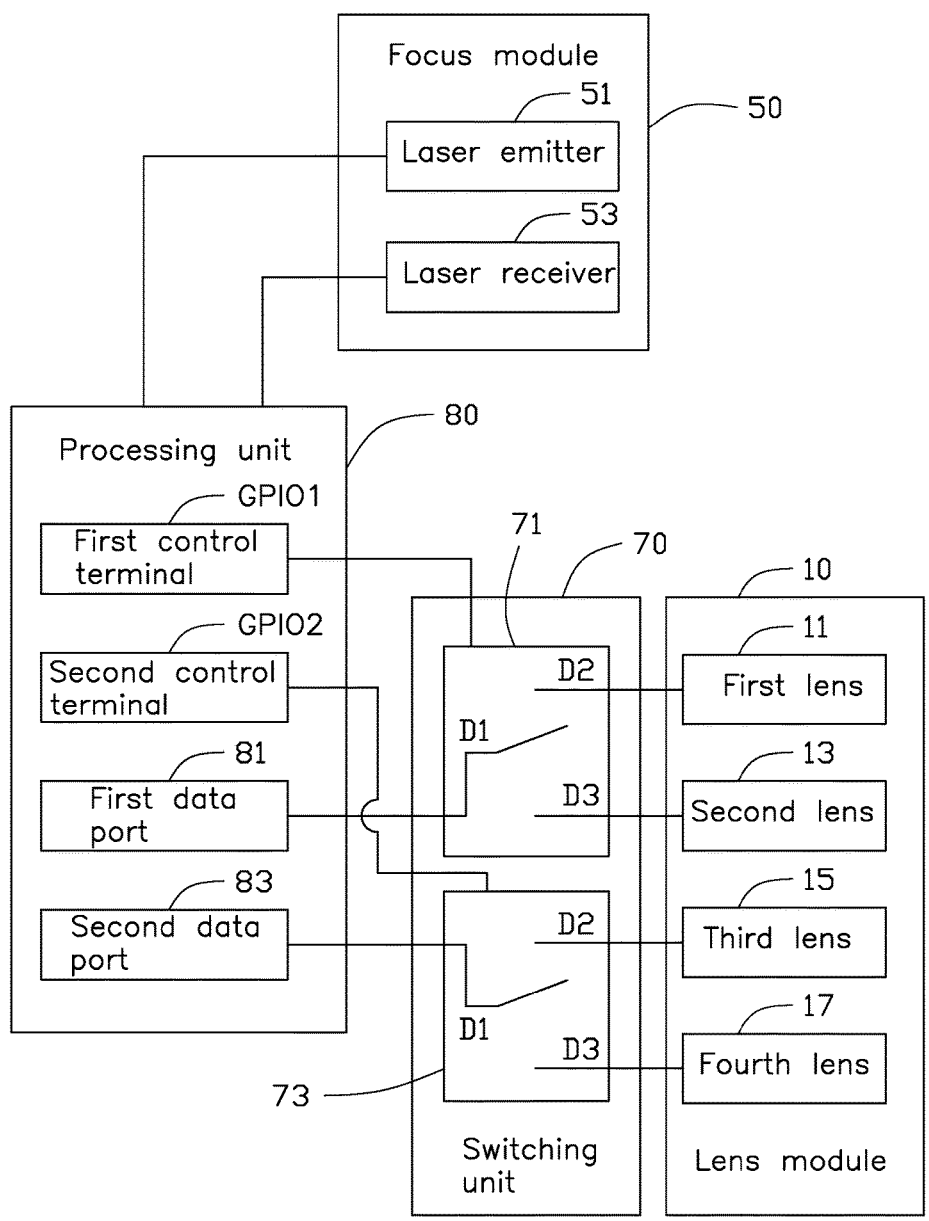
FIG. 3 is a circuit diagram of the multiple lenses system of FIG. 1.

The image sensing unit 30 is configured to capture images cooperatively with the lens module 10, that is, the lens module 10 captures images with the image sensing unit 30. The focus module 50 is configured to focus on the object to be captured and obtain a focus distance between the object and the focus module 50. In this exemplary embodiment, the focus module 50 obtains the focus distance through a method of laser ranging. As illustrated in FIG. 3, the focus module 50 includes a laser emitter 51 and a laser receiver 53. The laser emitter 51 is electrically connected to the processing unit 80 and emits laser beam towards the object under a control of the processing unit 80. The laser receiver 53 is electrically connected to the processing unit 80 and is configured to receive the laser beam reflected by the object. Then, the processing unit 80 can calculate and obtain the focus distance between the object and the focus module 50 according to a time difference from emitting the laser beam to receiving the laser beam.

The switching unit 70 includes at least one switch. The at least one switch is electrically connected to one lens and the processing unit 80. The processing unit 80 controls the switching unit 70 to switch to different lenses or groups of lenses. In this exemplary embodiment, the switching unit 70 includes two switches, that is, a first switch 71 and a second switch 73. The first switch 71 and the second switch 73 are both high-speed switches, for example, single pole double throw (SPDT) switches. Each switch includes a movable contact and two stationary contacts. Movable contacts D1 of the first switch 71 and the second switch 73 are both electrically connected to the processing unit 80. Each of the two stationary contacts D2 and D3 of the first switch 71 and the second switch 73 is electrically connected to one lens, respectively. For example, the stationary contact D2 of the first switch 71 is electrically connected to the first lens 11.

The stationary contact D3 of the first switch 71 is electrically connected to the second lens 13. The stationary contact D2 of the second switch 73 is electrically connected to the third lens 15. The stationary contact D3 of the second switch 73 is electrically connected to the fourth lens 17.

The processing unit 80 can be an image processer and includes at least one data port. In this exemplary embodiment, the number of the data ports is equal to the number of the switches. That is, the processing unit 80 includes a first data port 81 and a second data port 83. The first data port 81 is electrically connected to the movable contact D1 of the first switch 71. The second data port 83 is electrically connected to the movable contact D1 of the second switch 73. The first data port 81 and the second data port 83 are electrically connected to the lenses through the switching unit 70. Then, different lens or lenses can be selected for achieving different capturing functions.

The processing unit 80 further includes at least one control terminal. In this exemplary embodiment, the number of the control terminals is equal to the number of the switches. That is, the processing unit 80 includes a first control terminal GPIO1 and a second control terminal GPIO2. The first control terminal GPIO1 is electrically connected to the first switch 71. The second control terminal GPIO2 is electrically connected to the second switch 73. Then, the processing unit 80 can output controlling signals through the first control terminal GPIO1 and the second control terminal GPIO2 to switch the first switch 71 and the second switch 73.

The processing unit 80 can also set a plurality of capturing modes, for example, a normal mode, a 3D mode, a HDR mode, a low light image quality mode, and a high resolution mode. In at least one embodiment, the processing unit 80 is configured to select one of the capturing modes, to determine a lens or a group of the lenses according to the selected capturing mode and the detected focus distance, and to select the lens or the group of the lenses through switching the switching unit 70.

It can be understood that when a group of the lenses is selected for capturing, due to positions difference of the lenses, the processing unit 80 needs to cut a redundant part of the image captured by the group of the lenses and reserve a coinciding overlapping part, thus to present a consistent image.

In the exemplary embodiment, when the multiple lenses system 100 is in operation, the processing unit 80 selects a capturing mode. For example, the normal mode, the 3D mode, the HDR mode, the low light image quality mode, and the high resolution mode can be selected as a present capturing mode. The processing unit 80 triggers the focus module 50 to obtain a focus distance. In detail, the processing unit 80 controls the laser emitter 51 to emit laser beam towards the object and controls the laser receiver 53 to receive the laser beam reflected from the object. Then, the processing unit 80 calculates and obtains the focus distance between object and the focus module 50 according to a time difference from emitting the laser beam to receiving the laser beam.

The processing unit 80 selects at least one lens according to the present capturing mode and the detected focus distance. The processing unit 80 further outputs controlling signals through the first control terminal GPIO1 and the second control terminal GPIO2 according to the present capturing mode and the focus distance detected by the focus module 50. Then the switching unit 70 is switched to select at least one lens of the lens module 10. For example, when the focus distance is less than the focus distance threshold, the processing unit 80 controls the second switch 73 to switch to the fourth lens 17 through the second control terminal GPIO2 for capturing macro distance images. When the focus distance is greater than the focus distance threshold and the present capturing mode is the normal mode, the processing unit 80 controls the first switch 71 to switch to the second lens 13 through the first control terminal GPIO1 for capturing normal images. When the focus distance is greater than the focus distance threshold and the present capturing mode is the high resolution mode, the processing unit 80 controls the first switch 71 to switch to the first lens 11 through the first control terminal GPIO1 and controls the second switch 73 to switch to the third lens 15 through the second control terminal GPIO2 for capturing high resolution images. The image sensing unit 30 obtains an image according to the selected lens or group of lenses and transmits the image data to the processing unit 80 through the first data port 81 and the second data port 83.

In other exemplary embodiments, the lens module 10 may include more or less different lenses. Accordingly, the number of the switches of the switching unit 70, the number of the data ports of the processing unit 80, and the number of the control terminals can be adjusted according to the number of the lenses of the lens module 10.

In this exemplary embodiment, the first data port 81 and the second data port 83 can be high-speed data ports, for example, 4-line ports. Then, the plurality of lenses can share the high-speed data ports, and the multiple lenses system 100 can achieve improved response speed and processing speed when the multiple lenses system 100 use different lens or lenses.

As illustrated in FIG. 2, in other exemplary embodiments, the multiple lenses system 100 can obtain the focus distance through another method. In detail, the multiple lenses system 100 further includes a light sensing unit 90. The light sensing unit 90 is configured to sense a light intensity around the multiple lenses system 100. The processing unit 90 is electrically connected to the light sensing unit 90 and is configured to determine whether to activate the focus module 50 according to the light intensity detected by the light sensing unit 90. For example, when the multiple lenses system 100 is in a low-light environment, that is, the light intensity detected by the light sensing unit 90 is less than or equal to a predetermined value, the processing unit 90 activates the focus module 50. Then the processing unit 80 can quickly obtain the focus distance and switch to the lenses or group of lenses according to the focus distance. When the multiple lenses system 100 is in a high-light environment, that is, the light intensity detected by the light sensing unit 90 is greater than the predetermined value, the processing unit 80 obtains the focus distance through another method. For example, the processing unit 80 estimates the focus distance based on a resolution of the object's edge in the image captured by the image sensing unit 30, or the processing unit 80 obtains the focus distance by a phase detection auto focus (PDAF) technology of the lenses of the lens module 10.

The multiple lenses system 100 includes a lens module 10 having a plurality of lenses, thus the portable electronic device 200 may capture images according to the selected capturing mode and the focus distance, so that the corresponding lens or lenses are selected to increase the capturing speed and accuracy.

It is believed that the embodiments and their advantages will be understood from the foregoing description, and it will be apparent that various changes may be made thereto without departing from the scope of the disclosure or sacrificing all of its advantages, the examples hereinbefore described merely being illustrative embodiments of the disclosure.

What is claimed is:

1. A multiple lenses system comprising:
a lens module, the lens module comprising a plurality of lenses;
a processing unit, the processing unit setting a plurality of capturing modes and selecting one of the plurality of capturing modes as a present capturing mode, wherein different capturing modes are corresponding to different lens or lenses;
a switching unit, the switching unit electrically connected to the plurality of lenses and the processing unit;
a focus module, the focus module comprising a laser emitter and a laser receiver, the laser emitter electrically connected to the processing unit and configured to emit laser beam towards an object under control of the processing unit, the laser receiver electrically connected to the processing unit and configured to receive the laser beam reflected by the object;
wherein the processing unit obtains a focus distance between the object and the focus module according to a time difference from emitting the laser beam to receiving the laser beam, and controls the switching unit to select at least one of the plurality of lenses according to the present capturing mode and the focus distance.

2. The multiple lenses system of claim 1, further comprising an image sensing unit, wherein the at least one selected lens of the lens module capture images with the image sensing unit.

3. The multiple lenses system of claim 1, wherein the plurality of capturing modes at least comprises a normal mode, a 3D mode, a high dynamic range (HDR) mode, a low light image quality mode, and a high resolution mode.

4. The multiple lenses system of claim 1, wherein the switching unit comprises at least one switch, the processing unit comprises at least one data port; wherein a number of the at least one data port is equal to a number of the at least one switch, a movable contact of each of the at least one switch is electrically connected to one of the at least one data port, a stationary contact of each of the at least one switch is electrically connected to one of the at least one selected lens.

5. The multiple lenses system of claim 4, wherein the processing unit further comprises at least one control terminal, wherein a number of the at least one control terminal is equal to the number of the at least one switch, each of the at least one control terminal is electrically connected to one of the at least one switch and outputs a controlling signal for switching the at least one switch.

6. The multiple lenses system of claim 4, wherein the at least one data port is a high-speed data port.

7. The multiple lenses system of claim 2, further comprising a light sensing unit, wherein the light sensing unit is configured to sense a light intensity around the multiple lenses system, the processing unit is electrically connected to the light sensing unit and is configured to determine whether to activate the focus module according to the light intensity detected by the light sensing unit.

8. The multiple lenses system of claim 7, wherein when the light intensity detected by the light sensing unit is less than a predetermined value, the processing unit activates the focus module to obtain the focus distance; wherein when the light intensity detected by the light sensing unit is greater than the predetermined value, the processing unit obtains the focus distance through another method.

9. The multiple lenses system of claim 8, wherein the another method at least comprises: the processing unit estimates the focus distance based on a resolution of the object's edge in an image captured by the image sensing unit; or wherein the processing unit obtains the focus distance by a phase detection auto focus (PDAF) technology of the at least one selected lens of the lens module.

10. A portable electronic device comprising a multiple lenses system, the multiple lenses system comprising:
a lens module, the lens module comprising a plurality of lenses;
a processing unit, the processing unit setting a plurality of capturing modes and selecting one of the plurality of capturing modes as a present capturing mode, wherein different capturing modes are corresponding to different lens or lenses;
a switching unit, the switching unit electrically connected to the plurality of lenses and the processing unit;
a focus module, the focus module comprising a laser emitter and a laser receiver, the laser emitter electrically connected to the processing unit and configured to emit laser beam towards an object under control of the processing unit, the laser receiver electrically connected to the processing unit and configured to receive the laser beam reflected by the object;
wherein the processing unit obtains a focus distance between the object and the focus module according to a time difference from emitting the laser beam to receiving the laser beam, and controls the switching unit to select at least one of the plurality of lenses according to the present capturing mode and the focus distance.

11. The portable electronic device of claim 10, wherein the multiple lenses system further comprises an image sensing unit, wherein the at least one selected lens of the lens module capture images with the image sensing unit.

12. The portable electronic device of claim 10, wherein the plurality of capturing modes at least comprises a normal mode, a 3D mode, a high dynamic range (HDR) mode, a low light image quality mode, and a high resolution mode.

13. The portable electronic device of claim 10, wherein the switching unit comprises at least one switch, the processing unit comprises at least one data port; wherein a number of the at least one data port is equal to a number of the at least one switch, a movable contact of each of the at least one switch is electrically connected to one of the at least one data port, a stationary contact of each of the at least one switch is electrically connected to one of the at least one selected lens.

14. The portable electronic device of claim 13, wherein the processing unit further comprises at least one control terminal, wherein a number of the at least one control terminal is equal to the number of the at least one switch, each of the at least one control terminal is electrically connected to one of the at least one switch and outputs a controlling signal for switching the at least one switch.

15. The portable electronic device of claim 13, wherein the at least one data port is a high-speed data port.

16. The portable electronic device of claim 11, wherein the multiple lenses system further comprises a light sensing unit, wherein the light sensing unit is configured to sense a light intensity around the multiple lenses system, the processing unit is electrically connected to the light sensing unit and is configured to determine whether to activate the focus module according to the light intensity detected by the light sensing unit.

17. The portable electronic device of claim 16, wherein when the light intensity detected by the light sensing unit is less than a predetermined value, the processing unit activates the focus module to obtain the focus distance; wherein when the light intensity detected by the light sensing unit is greater than the predetermined value, the processing unit obtains the focus distance through another method.

18. The portable electronic device of claim 17, wherein the another method at least comprises: the processing unit estimates the focus distance based on a resolution of the object's edge in an image captured by the image sensing unit; or wherein the processing unit obtains the focus distance by a phase detection auto focus (PDAF) technology of the at least one selected lens of the lens module.

* * * * *